United States Patent
Kim et al.

(10) Patent No.: US 11,424,671 B2
(45) Date of Patent: Aug. 23, 2022

(54) OVERVOLTAGE PROTECTION CIRCUIT AND OPERATION METHOD THEREOF

(71) Applicant: Samsung Electronics Co., Ltd., Suwon-si (KR)

(72) Inventors: Moonyoung Kim, Suwon-si (KR); Jeongil Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1 day.

(21) Appl. No.: 16/986,822

(22) Filed: Aug. 6, 2020

(65) Prior Publication Data

US 2021/0044199 A1 Feb. 11, 2021

(30) Foreign Application Priority Data

Aug. 6, 2019 (KR) .................. 10-2019-0095714

(51) Int. Cl.
*H02M 1/32* (2007.01)
*H02M 3/158* (2006.01)
*H02H 3/20* (2006.01)
*H02H 7/12* (2006.01)

(52) U.S. Cl.
CPC .............. *H02M 1/32* (2013.01); *H02H 3/202* (2013.01); *H02H 7/1213* (2013.01); *H02M 3/158* (2013.01)

(58) Field of Classification Search
CPC ......... H02M 1/32; H02M 3/156; H02M 3/158
See application file for complete search history.

(56) References Cited

U.S. PATENT DOCUMENTS

| | | | | |
|---|---|---|---|---|
| 6,028,755 | A * | 2/2000 | Saeki | H02H 7/1213 361/91.1 |
| 8,068,324 | B2 | 11/2011 | Chiang | |
| 8,106,640 | B2 | 1/2012 | Itakura | |
| 10,158,287 | B2 | 12/2018 | Fox et al. | |
| 10,177,558 | B1 | 1/2019 | Ho et al. | |
| 2002/0130645 | A1* | 9/2002 | Tsai | H02M 1/32 323/274 |
| 2006/0208919 | A1* | 9/2006 | Mosher | H02M 1/32 340/662 |
| 2008/0231247 | A1* | 9/2008 | Uehara | H02M 3/158 323/284 |
| 2013/0279219 | A1* | 10/2013 | Oki | H02M 1/32 363/53 |
| 2018/0367027 | A1 | 12/2018 | Chen et al. | |
| 2018/0375320 | A1* | 12/2018 | Ho | H02M 3/156 |

FOREIGN PATENT DOCUMENTS

| | | |
|---|---|---|
| JP | 2007-20305 | 1/2007 |
| JP | 2018-60731 | 4/2018 |
| JP | 2019-37116 | 3/2019 |

* cited by examiner

*Primary Examiner* — Alex Torres-Rivera
(74) *Attorney, Agent, or Firm* — Staas & Halsey LLP

(57) ABSTRACT

Disclosed is an overvoltage protection circuit and method thereof. The overvoltage protection circuit includes a charge/discharge circuit configured to be charged or discharged based on a source voltage of a first transistor included in a non-isolated converter and a comparison circuit, based on a voltage charged in the charge/discharge circuit exceeding a threshold voltage, turn off a power supply circuit supplying power to the non-isolated converter.

18 Claims, 14 Drawing Sheets

OVERVOLTAGE PROTECTION CIRCUIT AND OPERATION METHOD THEREOF

CROSS-REFERENCE TO RELATED APPLICATION(S)

This application is based on and claims priority under 35 U.S.C. § 119 to Korean Patent Application No. 10-2019-0095714, filed on Aug. 6, 2019, in the Korean Intellectual Property Office, the disclosure of which is incorporated by reference herein in its entirety.

BACKGROUND

1. Field

The disclosure relates to an overvoltage protection circuit and an operation method thereof. More particularly, the disclosure relates to an overvoltage protection circuit for protecting a circuit when a non-isolated converter operates abnormally and an operation method thereof.

2. Description of Related Art

A buck converter is a non-isolated converter for boosting a voltage, which has a simple structure and may prevent an overvoltage through a field effect transistor (FET) control when an output voltage is increased.

Unlike the isolated converter of FIG. 1A, in a related-art non-isolated converter shown in FIG. 1B, an input voltage may be applied as it is to an output voltage when the FET is destroyed. Thus, a voltage that exceeds the internal pressure may be applied to an output capacitor may be applied, in which case an output capacitor may explode, or fire may occur.

In order to solve this problem, even if an output capacitor having an internal pressure in a level of the input voltage level is used, only the output capacitor is protected, and other circuit and elements connected to an output terminal of the buck converter may be destroyed.

Alternatively, as shown in FIG. 1C, a protection circuit may be implemented using a circuit such as a silicon-controlled rectifier (SCR) or a thyristor (TRIAC) circuit, or the like, but the element is generally expensive, and if the FET is destroyed, a fuse may be damaged due to overcurrent.

As shown in FIG. 1D or FIG. 1E, a protection circuit may be implemented by adding a serial switch (load switch) to turn off the switch, but the efficiency may be degraded because the switch must be always passed through even when the switch normally operates. In addition, when the serial switch itself is destroyed, there is a disadvantage in that protection of the output terminal is not possible.

The protection circuits of FIGS. 1C to 1E generally sense the output voltage and operate when the sensed output voltage exceeds a threshold voltage, as shown in FIG. 1F. Here, even if the output voltage exceeds the threshold voltage and the protection circuit operates, the output voltage may be increased to be greater than the threshold voltage due to the inertia of an inductor current, in which case the output capacitor may be damaged.

Accordingly, there is a necessity of a protection circuit for more effectively protecting a non-isolated converter.

SUMMARY

According to an embodiment, an overvoltage protection circuit includes a charge/discharge circuit configured to be charged or discharged based on a source voltage of a first transistor included in a non-isolated converter and a comparison circuit, based on a voltage charged in the charge/discharge circuit exceeding a threshold voltage, turn off a power supply circuit supplying power to the non-isolated converter.

The first transistor may be configured to, when operating normally, be periodically turned on and off to output a pulse-width modulation (PWM) signal as the source voltage, and when operating abnormally, output power supplied from the power supply circuit as the source voltage.

The comparison circuit may be configured to based on the first transistor operating normally and the charged voltage being maintained at lower than or equal to the threshold voltage by the PWM signal, turn on the power supply circuit, and based on the first transistor operating abnormally and the charged voltage by the power exceeding the threshold voltage, turn off the power supply circuit.

The threshold voltage may be set so that the power supply circuit is not operated at a voltage lower than a limit limiting overvoltage of an output voltage of the non-isolated converter.

The non-isolated converter may comprise the first transistor; a diode having a cathode connected to a source of the first transistor and an anode grounded; an inductor having an end connected to the source of the first transistor; and an output capacitor having one end connected to other end of the inductor and the other end grounded, and the charge/discharge circuit may comprises a resistance having one end connected to the source of the first transistor; and a capacitor having one end connected to the other end of the resistance and the other end grounded.

The overvoltage protection circuit may further comprise a discharge circuit having one end connected to a drain of the first transistor and other end grounded, wherein the comparison circuit may be configured to, based on the charged voltage exceeding the threshold voltage, turn on the discharge circuit.

The overvoltage protection circuit may further comprise a discharge circuit having one end connected to the source of the first transistor and other end grounded, wherein the comparison circuit may be configured to, based on the charged voltage exceeding the threshold voltage, turn on the discharge circuit.

The overvoltage protection circuit may further comprise a discharge circuit connected to the output capacitor in parallel, wherein the comparison circuit may be configured to, based on the charged voltage exceeding the threshold voltage, turn on the discharge circuit.

The non-isolated converter may comprise the first transistor; a second transistor having a drain connected to a source of the first transistor and a source grounded; a control circuit connected to a gate of the first transistor and a gate of the second transistor; an inductor having one end connected to the source of the first transistor; and an output capacitor having one end connected to other end of the inductor and other end grounded, and the charge/discharge circuit may comprise a resistance having one end connected to the source of the first transistor; and a capacitor having one end connected to the other end of the resistance and other end grounded.

The overvoltage protection circuit may further comprise a third transistor having a source connected to one end of the output capacitor and a drain connected to a gate of the second transistor; and a fourth transistor having a drain connected to the gate of the third transistor, and the source grounded, wherein the comparison circuit may be configured to, based on the charged voltage exceeding the threshold voltage, turn off the fourth transistor.

According to an embodiment, a method for operating of an overvoltage protection circuit includes charging or discharging a charge/discharge circuit based on a source voltage of a first transistor included in a non-isolated converter and based on a voltage charged in the charge/discharge circuit exceeding a threshold voltage, turning off a power supply circuit supplying power to the non-isolated converter.

The turning off may comprise, based on the first transistor operating abnormally, outputting power supplied from the power supply circuit as the source voltage, and based on the first transistor operating abnormally and the charged voltage exceeding the threshold voltage by the power, turning off the power supply circuit.

The threshold voltage may be set so that the power supply circuit is not operated at a voltage lower than a limit limiting overvoltage of an output voltage of the non-isolated converter.

The method may further comprise based on the first transistor operating normally, the first transistor is being periodically turned on and off and outputting a pulse-width modulation (PWM) signal as the source voltage, and based on the charged voltage being maintained at lower than or equal to the threshold voltage, turning on the power supply circuit.

The non-isolated converter may comprise the first transistor; a diode having a cathode connected to a source of the first transistor and an anode grounded; an inductor having an end connected to the source of the first transistor; and an output capacitor having one end connected to other end of the inductor and the other end grounded, and the charge/discharge circuit may comprise a resistance having one end connected to the source of the first transistor; and a capacitor having one end connected to the other end of the resistance and the other end grounded.

The turning off may comprise, based on the charged voltage exceeding the threshold voltage, turning on a discharge circuit having one end connected to a drain of the first transistor and other end grounded.

The turning off may comprise, based on the charged voltage exceeding the threshold voltage, turning on a discharge circuit having one end connected to the source of the first transistor and other end grounded.

The turning off may comprise, based on the charged voltage exceeding the threshold voltage, turning on a discharge circuit connected to the output capacitor in parallel.

The non-isolated converter may comprise the first transistor; a second transistor having a drain connected to a source of the first transistor and a source grounded; a control circuit connected to a gate of the first transistor and a gate of the second transistor; an inductor having one end connected to the source of the first transistor; and an output capacitor having one end connected to other end of the inductor and other end grounded, and the charge/discharge circuit may comprise a resistance having one end connected to the source of the first transistor; and a capacitor having one end connected to the other end of the resistance and other end grounded.

The turning off may comprise, based on the charged voltage exceeding the threshold voltage, turning off the fourth transistor.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
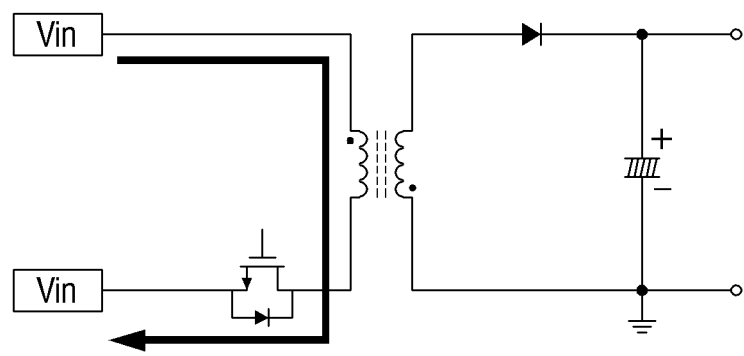
FIGS. 1A, 1B, 1C, 1D, 1E, and 1F are diagrams illustrating a problem of related art.
Figure 1B:
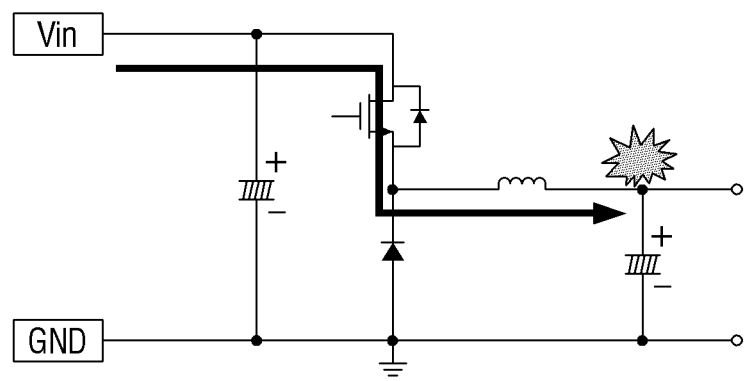
Figure 1C:
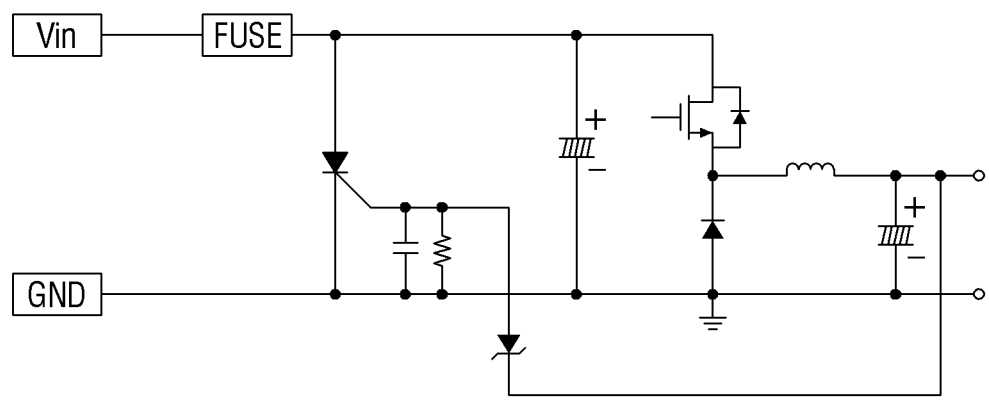
Figure 1D:
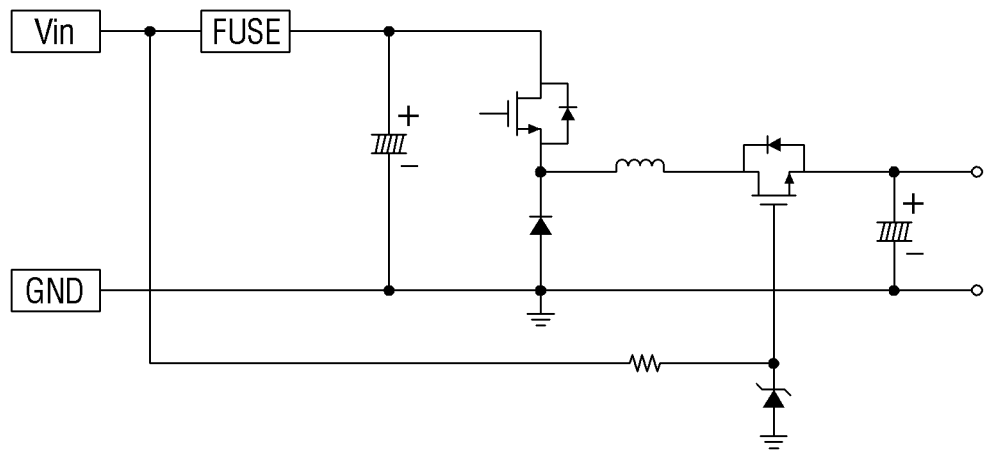
Figure 1E:
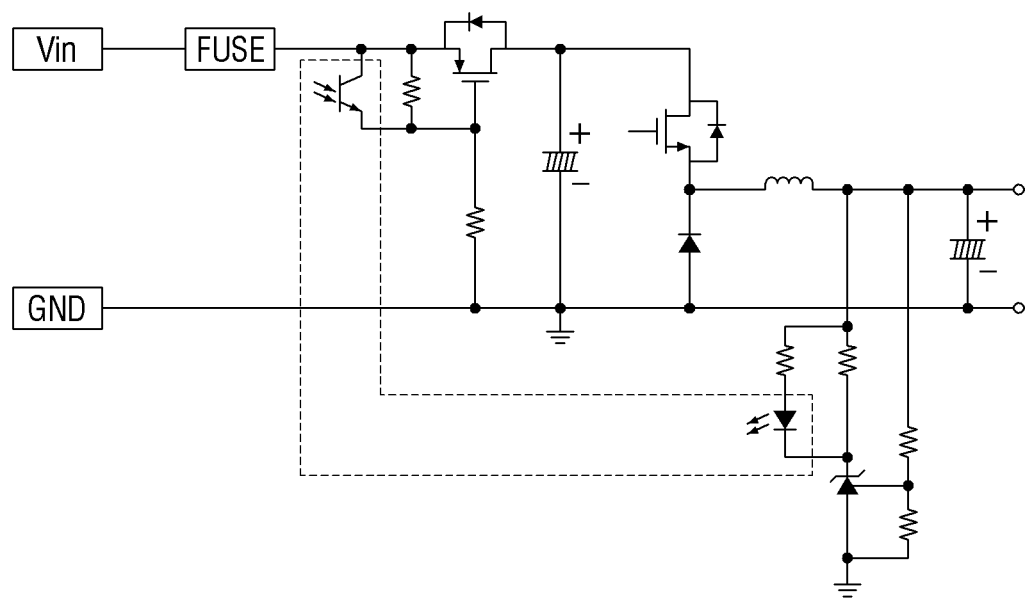

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The objective of the disclosure is to provide an overvoltage protection circuit for protecting a converter circuit when a non-isolated converter operates abnormally and an operation method thereof.

According to various embodiments, the overvoltage protection circuit may perform a circuit protection operation faster than a related art overvoltage protection circuit by identifying an abnormal operation of the FET.

Various embodiments will be described in detail with reference to the drawings attached hereto.

Figure 2A:
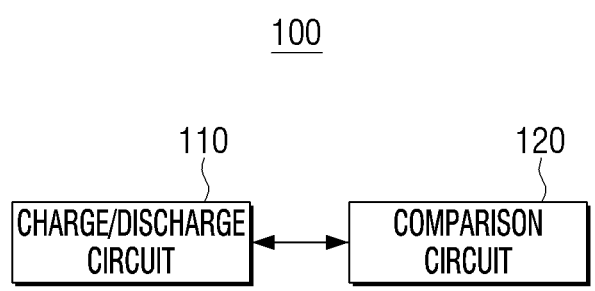
FIGS. 2A and 2B are diagrams illustrating a circuit configuration of an overvoltage protection circuit according to an embodiment.

FIG. 2A is a block diagram illustrating a configuration of an overvoltage protection circuit 100 according to an embodiment. As illustrated in FIG. 2, the overvoltage protection circuit 100 may include a charge/discharge circuit 110 and a comparison circuit 120.

The charge/discharge circuit 110 may be charged or discharged based on a source voltage of a transistor included in the non-isolated converter. For example, the charge/discharge circuit 110 may include a capacitor, and if the source voltage of the transistor is at a high level, the charge/discharge circuit 110 may be charged, and if the source voltage of the transistor is at a low level, the charge/discharge circuit 110 may be discharged.

The transistor of the non-isolated converter may receive power on and off signals through a gate. That is, when the transistor normally operates, the transistor may be periodically turned on and off to supply or block the power supplied from the power supply circuit. If the power supplied from the power supply circuit is a direct current (DC) power source, the transistor may output a pulse width modulation (PWM) signal as a source voltage according to an ON and OFF operation. However, when the transistor operates abnormally, the transistor may output power supplied from the power supply circuit as a source voltage.

When the transistor operates normally, the charge/discharge circuit 110 may be periodically charged and discharged by the PWM signal. That is, the voltage charged to the charge/discharge circuit 110 has a waveform of a periodic signal.

When the transistor operates abnormally, the charge/discharge circuit 110 may be continuously charged by a power source supplied from a power supply circuit. That is, the voltage charged in the charge/discharge circuit 110 gradually increases.

The comparison circuit 120, when voltage charged in the charge/discharge circuit exceeds a threshold voltage, may turn off the power supply circuit supplying power to the non-isolated converter.

For example, the comparison circuit 120 may turn on the power supply circuit if the transistor normally operates and the voltage charged by the PWM signal is maintained below or equal to a threshold voltage, and if the transistor abnormally operates and voltage charged by the power supply exceeds the threshold voltage, the comparison circuit 120 may turn off the power supply circuit.

Here, the threshold voltage may be greater than the maximum voltage of the voltage charged in the charge/discharge circuit 110 having the waveform of the periodic signal during normal operation of the transistor. The threshold voltage may be set so that the power supply circuit does not operate at a voltage lower than the limiting overvoltage of the output voltage of the non-isolated converter, which will be described in detail later with reference to the drawings.

Figure 2B:
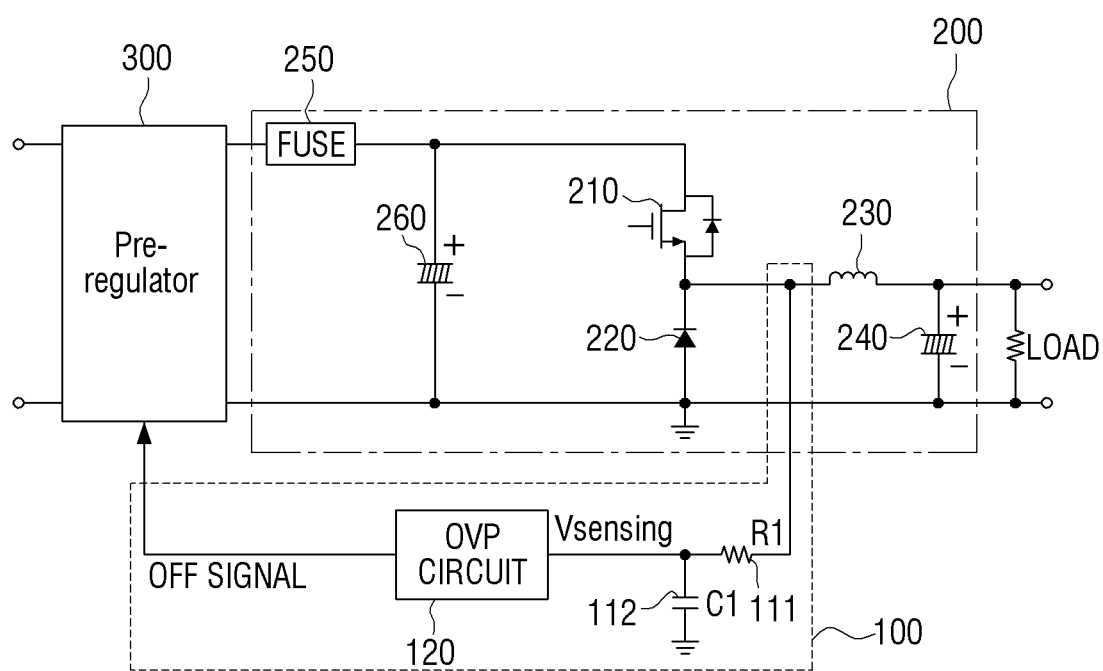

FIG. 2B is a diagram illustrating a circuit configuration of an overvoltage protection circuit 100 according to an embodiment. To more clearly illustrate the operation of the overvoltage protection circuit 100, FIG. 2B further illustrates a non-isolated converter 200 and a pre-regulator (power supply circuit) 300.

For convenience, the circuit configuration of the non-isolated converter 200 will be described first. The non-isolated converter 200 may receive power from the power supply circuit 300. The non-isolated converter 200 may include a transistor 210, a diode 220, an inductor 230, and an output capacitor 240. A source of transistor 210 may be coupled to the cathode of the diode 220 and to one end of an inductor 230, and the anode of diode 220 may be grounded. The other end of the inductor 230 may be connected to one end of an output capacitor 240, and the other end of the output capacitor 240 may be grounded. The transistor 210 may be connected in parallel to the source and a drain of the transistor 210, and may further include a diode for preventing the transistor 210 from being damaged due to the back electromotive force.

The non-isolated converter 200 may further include a fuse 250 and an input capacitor 260. One end of the fuse 250 may be used as an input terminal, and the other end may be connected to one end of the input capacitor 260 and to the drain of the transistor 210. The other end of the input capacitor 260 may be grounded. For convenience, a node to which the source of the transistor 210, the cathode of the diode 220, and one end of the inductor 230 are connected is described as a first node.

The overvoltage protection circuit 100 may include the charge/discharge circuit 110 and an overvoltage protection circuit (OVP) circuit 120 formed of resistors R1 111 and a capacitor C1 112. The resistor 111 may have one end connected to the source of the transistor 210 and the other end connected to one end of the capacitor 112. The other end of capacitor 112 may be grounded. The comparison circuit 120 may have one end connected to the node between the resistor 111 and the capacitor 112, and the other end connected to the power supply circuit 300. For convenience, a node between the resistor 111 and the capacitor 112 will be described as a second node.

When the transistor 210 operates normally according to power on and off signals received through the gate, the transistor 210 may be turned on and off periodically and may output the PWM signal to the first node.

In this example, the comparison circuit 120 may turn on the power supply circuit 300 when the transistor 210 operates normally and the voltage of the second node is maintained below or equal to the threshold voltage by the PWM signal. That is, the comparison circuit 120 may maintain the power supply circuit 300 in a turned-on state.

Figure 3:
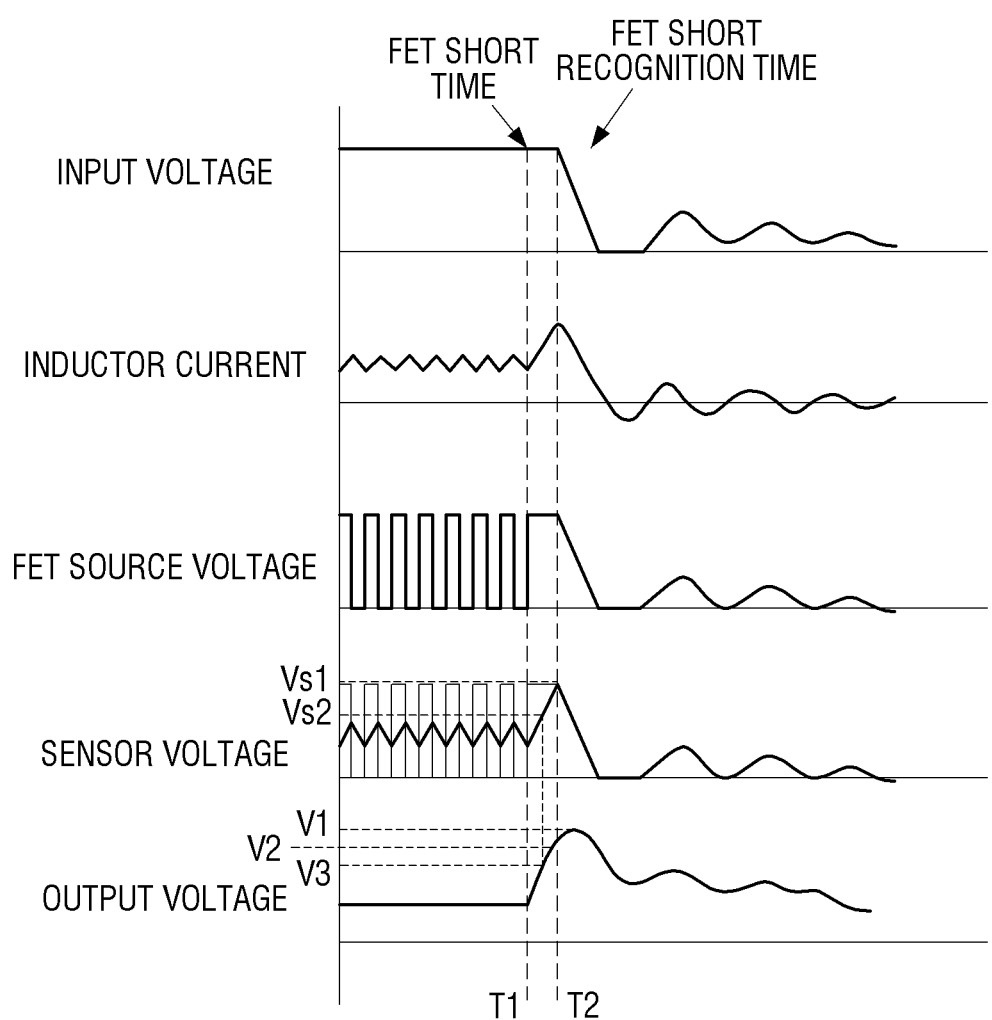
FIG. 3 is a diagram illustrating an overvoltage protection circuit according to an embodiment.

For example, as shown in FIG. 3, before time T1, the DC voltage may be input to the non-isolated converter 200 as the input voltage, and the transistor 210 may be periodically turned on and off to output the PWM signal to the first node, such as the FET source voltage before the time T1 of FIG. 3. That is, the first node may have a format in which the input voltage and a GND voltage alternate.

The capacitor 112 repeats the charging and discharging by the PWM signal of the first node, so that the voltage of the first node may be a triangular waveform, such as the sensing voltage before the time T1 of FIG. 3. Since the voltage of the second node is maintained below or equal to the threshold voltage, the comparison circuit 120 may maintain the power supply circuit 300 in a turned-on state. The inductor current may also be a triangular waveform prior to the T1 time point, and the output voltage may be maintained at a DC voltage.

Afterwards, when the transistor 210 abnormally operates, the power supplied from the power supply circuit 300 may be output to the first node. For example, if the transistor 210 fails, the source and drain of the transistor 210 may be shorted such that the first node may be powered from the power supply circuit 300.

In this example, the comparison circuit 120 may turn off the power supply circuit 300 if the transistor 210 operates abnormally and the voltage of the second node exceeds the threshold voltage by the power supply.

For example, as shown in FIG. 3, when the transistor 210 operates abnormally at time T1, the first node may be powered from power supply circuit 300, regardless of whether the transistor 210 is periodically on or off after T1. That is, after T1, the first node is no longer applied with the PWM signal.

In this example, since the voltage of the first node is constant, the capacitor 112 is continuously charged so that the voltage of the second node increases as the sensing voltage after the time T1 of FIG. 3. The comparison circuit 120 may turn off the power supply circuit 300 since the voltage of the second node exceeds the threshold voltage.

In FIG. 3, the comparison circuit 120 is shown to turn off the power supply circuit 300 at time T2. Even if the power supply circuit 300 is turned off from T2, the input voltage may be gradually decreased by the input capacitor 260. Even if the power supply circuit 300 is turned off from T2, the inductor 230 stores energy, so that the output voltage may rise to a V1 voltage which is higher than the output voltage at T2.

The threshold voltage may be set such that the power supply circuit 300 does not operate at a voltage lower than the limiting overvoltage of the output voltage of the non-isolated converter 200.

For example, assuming that the voltage for preventing failure of the transistor 210 is a V2 voltage rather than the V1 voltage of FIG. 3, the threshold voltage may be set such that the comparison circuit 120 operates at a V3 voltage which is lower than the V2 voltage in consideration of the energy of the inductor 230. In other words, the threshold voltage of the Vs1 may be set to a threshold voltage of Vs2, so that the operating time point of the comparison circuit 120 may be set faster. Even if the threshold voltage of Vs2 is set, the voltage of the second node in the normal operation is maintained at a triangular waveform and thus, the voltage of the second node may be less than the threshold voltage of the Vs2, and the comparison circuit 120 does not operate.

Figure 1F:
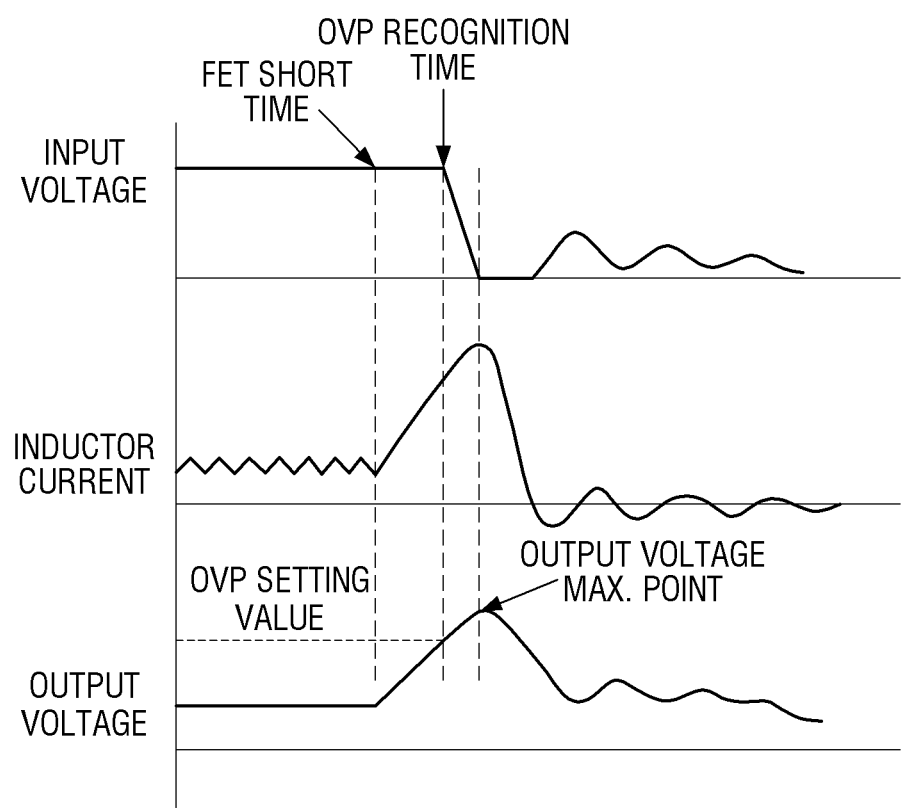

According to the related art as shown in FIG. 1F, since the protection circuit operates by sensing the output voltage itself, the sensing timing becomes late and it is impossible to protect the circuit.

According to the related art, a protection circuit may operate on the basis of a lower output voltage, in which example it is possible to protect the circuit even if the transistor operates abnormally. However, there may be a problem in that, even if the transistor operates normally, the protection circuit may operate until the load is instantaneously increased. For example, a problem may occur that, if the load is instantaneously increased to increase the output voltage, the protection circuit operates to stop the operation of the converter, but in this case there is no problem in the transistor, so it is not necessary to stop the operation of the converter. That is, an unnecessary protection operation may occur.

In this regard, according to an embodiment, even if the load is instantaneously increased, the voltage of the second node is not abruptly changed according to the characteristics of the capacitor 112. Accordingly, the overvoltage protection circuit 100 may sense the abnormal operation of the transistor 210 more quickly, thereby protecting the circuit of the non-isolated converter 200 and minimizing a case in which the non-isolated converter 200 unnecessarily operates and stops.

The comparison circuit 120 may be a circuit that receives a voltage and a threshold voltage of the second node and outputs a comparison result of the two voltages. For example, the comparison circuit 120 may be implemented as a comparator or the like, receives a voltage and a threshold voltage of the second node, outputs a voltage of the first level when the voltage of the second node is greater than the threshold voltage, and outputs a voltage of the second level if the threshold voltage is greater than the voltage of the second node. However, the embodiment is not limited thereto and if the above operation is possible, the comparison circuit 120 may be any type of circuit configuration.

Figure 4A:
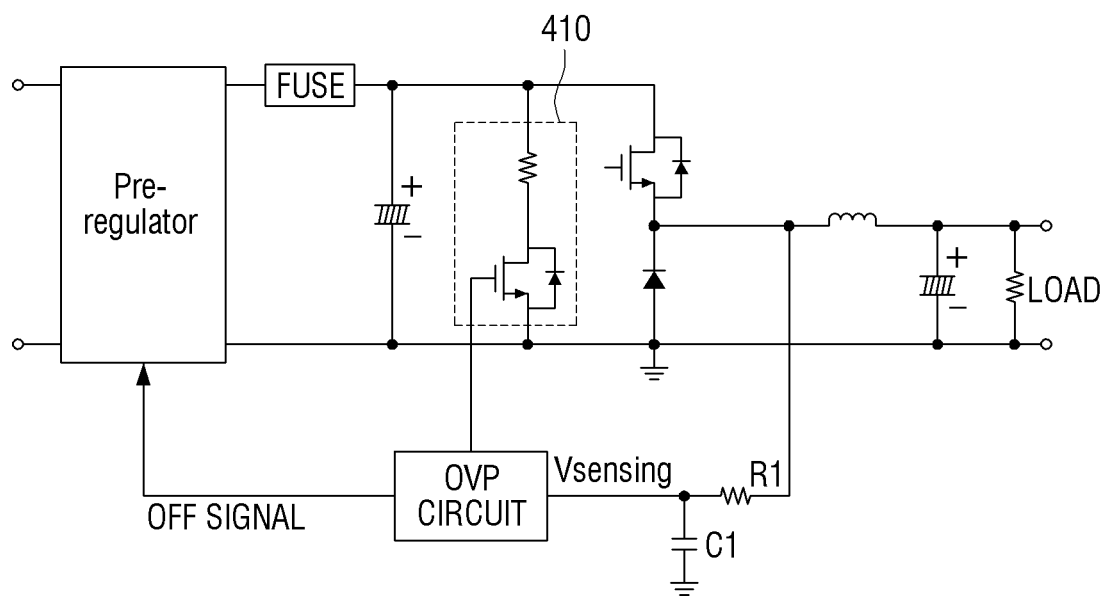
FIGS. 4A, 4B, and 4C are diagrams illustrating a discharge circuit according to various embodiments.
Figure 4B:
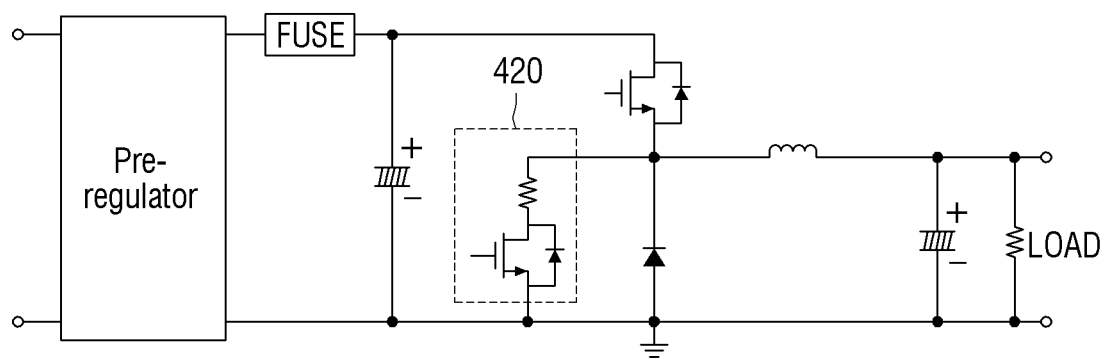
Figure 4C:
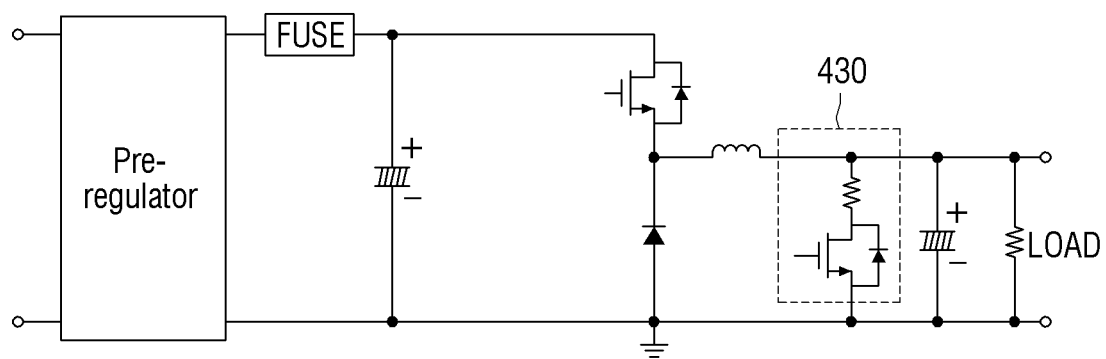

FIGS. 4A, 4B, and 4C are diagrams illustrating a discharge circuit according to various embodiments.

As illustrated in FIG. 4A, the discharge circuit 410 has one end connected to the drain of the transistor 210 and the other end grounded. The comparison circuit 120 may turn on the discharge circuit 410 if the voltage charged to the charge/discharge circuit 110 exceeds a threshold voltage.

The discharge circuit 410 operates when the transistor 210 fails and may discharge the voltage of the input capacitor 260. As a result, increase in the current and output voltage of the inductor 230 may be suppressed.

Alternatively, as shown in FIG. 4B, the discharge circuit 420 may have one end connected to the source of the first transistor and the other end grounded, and the comparison circuit 120 may turn on the discharge circuit 420 if the voltage charged in the charge/discharge circuit 110 exceeds the threshold voltage.

As shown in FIG. 4C, the discharge circuit 430 may be connected in parallel to the output capacitor 240, and the comparison circuit 120 may turn on the discharge circuit 430 if the voltage charged in the charge/discharge circuit 110 exceeds the threshold voltage.

Figure 5:
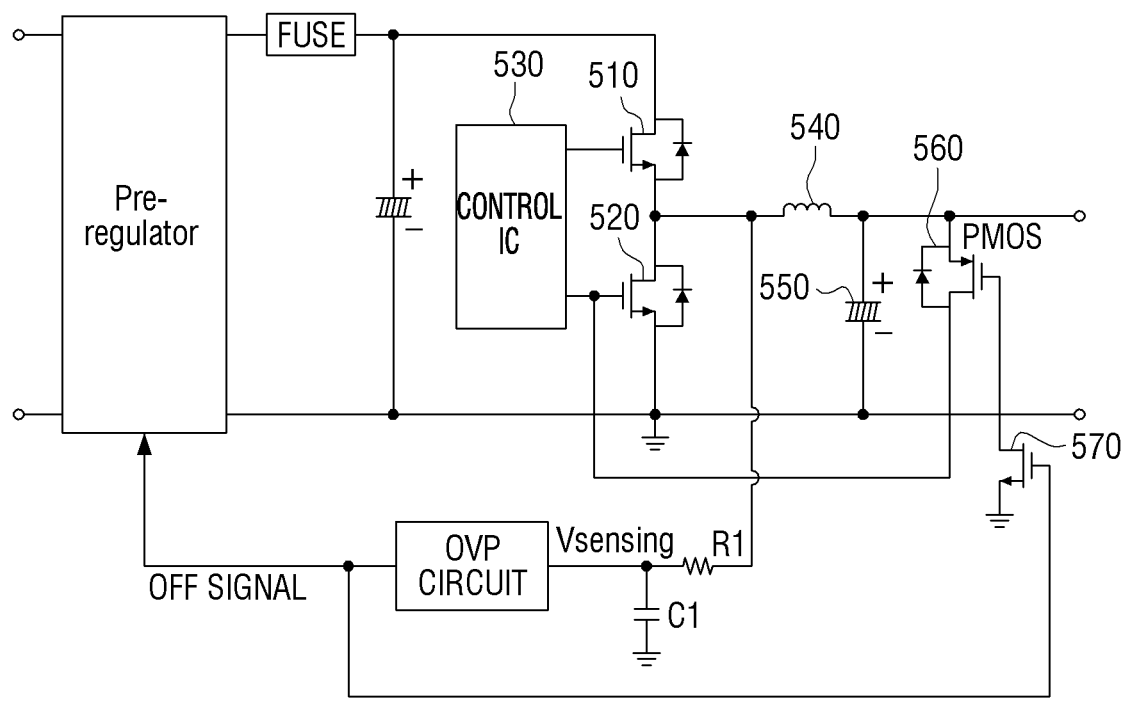
FIG. 5 is a diagram illustrating a discharge circuit of a non-isolated converter according to another embodiment.

FIG. 5 is a diagram illustrating a discharge circuit of a non-isolated converter according to another embodiment.

The non-isolated converter may be a synchronous buck converter that includes a transistor on a low side. For example, the non-isolated converter may include a first transistor 510, a second transistor 520, a control circuit (control IC) 530, an inductor 540, and an output capacitor 550, as shown in FIG. 5. Here, the source of the first transistor 510 may be connected to the first node, the drain of the second transistor 520 may be connected to the first node, and the source may be grounded. The control circuit 530 may be connected to a gate of the first transistor 510 and to a gate of the second transistor 520 to control the first transistor 510 and the second transistor 520, and the inductor 540 may have one end connected to the first node. The output capacitor 550 may have one end connected to the other end of the inductor 540 and the other end grounded.

The non-isolated converter may further include a fuse and an input capacitor, which is the same as FIG. 2 and will not be further described. The comparison circuit is the same as FIG. 2 and will not be further described.

In the case of a synchronous buck converter, the second transistor 520 may be used for discharging. The discharge circuit may include a third transistor 560 having a source connected to one end of the output capacitor 550, a drain connected to the gate of the second transistor 520, and a fourth transistor 570 having a drain connected to the gate of the third transistor 560 and a source grounded. The comparison circuit may turn off the fourth transistor 570 when the voltage of the second node exceeds the threshold voltage. In this example, the third transistor 560 is turned on, and the second transistor 520 is also turned on to perform a discharge operation.

That is, when a failure of the first transistor 510 is detected, the comparison circuit may pull up the second transistor 520 regardless of the gate control of the second transistor 520 of the control circuit 530, and may perform a discharge operation.

Figure 6:
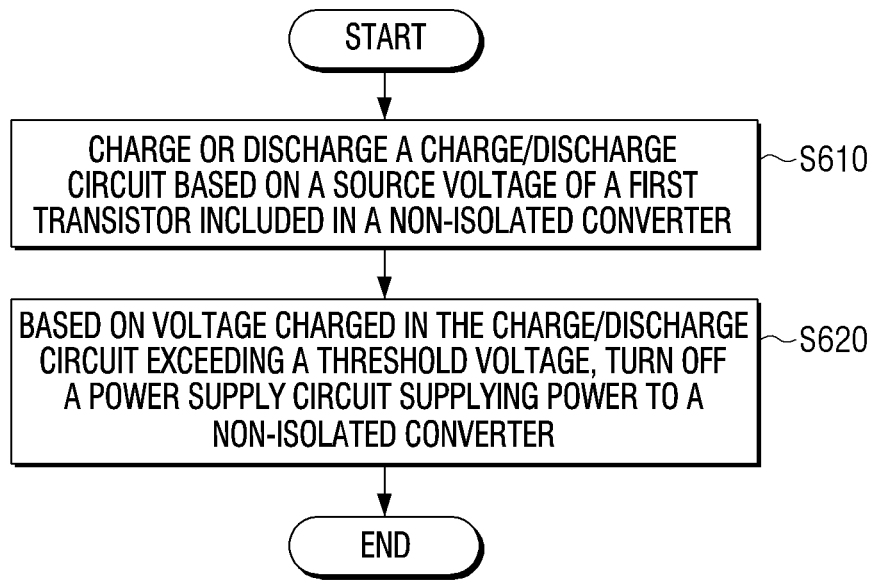
FIG. 6 is a flowchart illustrating a method for operating an overvoltage protection circuit according to an embodiment.

FIG. 6 is a flowchart illustrating a method for operating an overvoltage protection circuit according to an embodiment.

First, the charge/discharge circuit is charged or discharged based on the source voltage of the first transistor included in the non-isolated converter in operation S610. When the voltage charged in the charge/discharge circuit exceeds a threshold voltage, the power supply circuit for supplying power to the non-isolated converter is turned off in operation S620.

In step S620, when the first transistor operates abnormally, the power supplied from the power supply circuit may be output as a source voltage, and when the transistor operates abnormally and the voltage charged by the power source exceeds the threshold voltage, the power supply circuit may be turned off.

The threshold voltage may be set so that the power supply circuit does not operate at a voltage lower than the limiting overvoltage of the output voltage of the non-isolated converter.

The method may further include, based on the first transistor operating normally, the transistor may periodically turn on and off to output the PWM signal as a source voltage, and based on the discharged voltage being maintained below or equal to a threshold value, turning on the power supply circuit.

The non-isolated converter may include a first transistor, a diode having a cathode connected to the source of the first transistor and an anode grounded, an inductor of which one end is connected to the source of the first transistor, an output capacitor having one end connected to the other end of the inductor, and the other grounded, and the charge/discharge circuit may include a resistance and a capacitor having an end connected to the other end of the resistance and the other end grounded.

The turning off in operation S620 may include, based on the charged voltage exceeding the threshold voltage, turning on a discharge circuit having one end connected to the drain of the first transistor, and the other end grounded.

The turning off in operation S620 may include, based on the charged voltage exceeding the threshold voltage, turning on the discharge circuit having one end connected to the source of the first transistor and the other end grounded.

The turning off in operation S620 may include turning on the discharge circuit connected to the output capacitor in parallel, based on the charged voltage exceeding the threshold voltage.

The non-isolated converter may include a first transistor, a second transistor having a drain connected to a source of the first transistor and a source grounded, a control circuit connected to a gate of the first transistor and a gate of the second transistor, an inductor having one end connected to the source of the first transistor, an output capacitor having one end connected to the other end of the inductor and the other end grounded, a third transistor of which a source connected to one end of the output capacitor and drain connected to a gate of the second transistor, and a fourth transistor of which the drain being connected to the gate of the third transistor and the source grounded, wherein the charge/discharge circuit may include a resistance having one end connected to the source of the first transistor and the other end grounded.

Turning off in operation S610 may include turning off the fourth transistor when the charged voltage exceeds the threshold voltage.

For convenience, it is described that the non-isolated converter includes the third transistor and the fourth transistor, but the third transistor and the fourth transistor may be external configurations of the non-isolated converter.

According to various embodiments, the overvoltage protection circuit may perform a circuit protection operation faster than a related art overvoltage protection circuit by identifying an abnormal operation of the FET.

Each of the components (for example, a module or a program) according to the embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments, may be performed sequentially, in a parallel, repetitive, or heuristic manner, or at least some operations may be performed in a different order, omitted, or other operations can be added.

While the disclosure has been shown and described above with reference to various embodiments, it will be understood by those skilled in the art that various changes in form and details may be made therein without departing from the spirit and scope of the disclosure as defined at least by the appended claims and their equivalents.

What is claimed is:

1. An overvoltage protection circuit comprising:
   a charge/discharge circuit configured to be charged or discharged based on a source voltage of a first transistor included in a non-isolated converter, the non-isolated converter comprising
      a second transistor having a drain connected to a source of the first transistor and a source of the second transistor being grounded,
      an inductor having one end connected to the source of the first transistor, and
      an output capacitor having one end connected to another end of the inductor and another end grounded;
   a comparison circuit to, based on a voltage charged in the charge/discharge circuit exceeding a threshold voltage, turn off a power supply circuit supplying power to the non-isolated converter,
   a third transistor having a source connected to the one end of the output capacitor and a drain connected to a gate of the second transistor; and
   a fourth transistor having a drain connected to a gate of the third transistor, and a source of the fourth transistor being grounded,
   wherein the comparison circuit is configured to, based on the charged voltage exceeding the threshold voltage, turn off the fourth transistor.

2. The overvoltage protection circuit of claim 1, wherein the first transistor is configured to, when operating normally, be periodically turned on and turned off to output a pulse-width modulation (PWM) signal as the source voltage, and when operating abnormally, output power supplied from the power supply circuit as the source voltage.

3. The overvoltage protection circuit of claim 2, wherein the power supply circuit is controlled by the comparison circuit that is configured to:
   turn on the power supply circuit based on the first transistor operating normally and the charged voltage being maintained at lower than or equal to the threshold voltage by the PWM signal, and
   turn off the power supply circuit, based on the first transistor operating abnormally and the charged voltage by the power exceeding the threshold voltage.

4. The overvoltage protection circuit of claim 3, wherein the threshold voltage is set so that the power supply circuit is not operated at a voltage lower than a limiting overvoltage of an output voltage of the non-isolated converter.

5. The overvoltage protection circuit of claim 1, wherein:
   the non-isolated converter comprises:
      a diode having a cathode connected to the source of the first transistor and an anode grounded;
      an inductor having an end connected to the source of the first transistor; and
      an output capacitor having one end connected to the other end of the inductor and another end grounded, and
   the charge/discharge circuit comprises:

a resistance having one end connected to the source of the first transistor; and a capacitor having one end connected to another end of the resistance and another end grounded.

6. The overvoltage protection circuit of claim 5, further comprising:
a discharge circuit having one end connected to a drain of the first transistor and another end grounded,
wherein the comparison circuit is configured to, based on the charged voltage exceeding the threshold voltage, turn on the discharge circuit.

7. The overvoltage protection circuit of claim 5, further comprising:
a discharge circuit having one end connected to the source of the first transistor and another end grounded,
wherein the comparison circuit is configured to, based on the charged voltage exceeding the threshold voltage, turn on the discharge circuit.

8. The overvoltage protection circuit of claim 5, further comprising:
a discharge circuit connected to the output capacitor in parallel,
wherein the comparison circuit is configured to, based on the charged voltage exceeding the threshold voltage, turn on the discharge circuit.

9. The overvoltage protection circuit of claim 1, wherein the non-isolated converter comprises:
a control circuit connected to a gate of the first transistor and the gate of the second transistor; and
the charge/discharge circuit comprises:
a resistance having one end connected to the source of the first transistor; and
a capacitor having one end connected to another end of the resistance and another end grounded.

10. A method for operating of an overvoltage protection circuit, the method comprising:
charging or discharging a charge/discharge circuit based on a source voltage of a first transistor included in a non-isolated converter, the non-isolated converter comprising a second transistor having a drain connected to a source of the first transistor and a source of the second transistor being grounded, an inductor having one end connected to the source of the first transistor, and an output capacitor having one end connected to another end of the inductor and another end grounded;
based on a voltage charged in the charge/discharge circuit exceeding a threshold voltage, turning off a power supply circuit supplying power to the non-isolated converter,
wherein the overvoltage protection circuit comprises:
a third transistor having a source connected to one end of the output capacitor and a drain connected to a gate of the second transistor; and
a fourth transistor having a drain connected to a gate of the third transistor, and a source the fourth transistor being grounded,
wherein the turning off comprises:
based on the charged voltage exceeding the threshold voltage, turning off the fourth transistor.

11. The method of claim 10, wherein the turning off comprises:
based on the first transistor operating abnormally, outputting power supplied from the power supply circuit as the source voltage, and
based on the first transistor operating abnormally and the charged voltage exceeding the threshold voltage by the power, turning off the power supply circuit.

12. The method of claim 11, wherein the threshold voltage is set so that the power supply circuit is not operated at a voltage lower than a limiting overvoltage of an output voltage of the non-isolated converter.

13. The method of claim 10, further comprising:
based on the first transistor operating normally, the first transistor is periodically turned on and turned off and outputting a pulse-width modulation (PWM) signal as the source voltage, and based on the charged voltage being maintained at lower than or equal to the threshold voltage, turning on the power supply circuit.

14. The method of claim 10, wherein:
the non-isolated converter comprises:
a diode having a cathode connected to the source of the first transistor and an anode grounded;
an inductor having an end connected to the source of the first transistor; and
an output capacitor having one end connected to the other end of the inductor and another end grounded, and
the charge/discharge circuit comprises:
a resistance having one end connected to the source of the first transistor; and
a capacitor having one end connected to another end of the resistance and another end grounded.

15. The method of claim 14, wherein the turning off comprises, based on the charged voltage exceeding the threshold voltage, turning on a discharge circuit having one end connected to a drain of the first transistor and another end grounded.

16. The method of claim 14, wherein the turning off comprises:
based on the charged voltage exceeding the threshold voltage, turning on a discharge circuit having one end connected to the source of the first transistor and another end grounded.

17. The method of claim 14, wherein the turning off comprises, based on the charged voltage exceeding the threshold voltage, turning on a discharge circuit connected to the output capacitor in parallel.

18. The method of claim 10, wherein
the non-isolated converter comprises:
a control circuit connected to a gate of the first transistor and the gate of the second transistor and
the charge/discharge circuit comprises:
a resistance having one end connected to the source of the first transistor; and
a capacitor having one end connected to another end of the resistance and another end grounded.

* * * * *